(12) United States Patent
Zebisch et al.

(10) Patent No.: US 9,403,317 B2
(45) Date of Patent: Aug. 2, 2016

(54) FRICTION WELDING ELEMENT

(71) Applicant: EJOT GmbH & Co. KG, Bad Berleburg (DE)

(72) Inventors: Sebastian Zebisch, Tambach-Dietharz (DE); Marco Mielisch, Erfurt (DE)

(73) Assignee: EJOT GmbH & Co., KG, Bad Berleburg (DE)

( * ) Notice: Subject to any disclaimer, the term of this patent is extended or adjusted under 35 U.S.C. 154(b) by 0 days.

(21) Appl. No.: 14/135,208

(22) Filed: Dec. 19, 2013

(65) Prior Publication Data
US 2014/0174669 A1 Jun. 26, 2014

(30) Foreign Application Priority Data

Dec. 21, 2012 (DE) .......................... 10 2012 112 895

(51) Int. Cl.
| | |
|---|---|
| *B32B 37/00* | (2006.01) |
| *B29C 65/06* | (2006.01) |
| *B21J 15/02* | (2006.01) |
| *B23K 20/12* | (2006.01) |

(Continued)

(52) U.S. Cl.
CPC ............... *B29C 65/06* (2013.01); *B21J 15/027* (2013.01); *B23K 20/12* (2013.01); *B23K 20/129* (2013.01); *B23K 20/16* (2013.01); *F16B 5/08* (2013.01)

(58) Field of Classification Search
CPC ..... B21J 15/027; B23K 20/12; B23K 20/129; B29C 65/06; B29C 65/0672
USPC .............. 156/73.5, 91, 92, 308.2, 308.4, 580, 156/581, 583.1; 403/270, 271, 272; 428/138, 139
See application file for complete search history.

(56) References Cited

U.S. PATENT DOCUMENTS

| | | | | |
|---|---|---|---|---|
| 3,468,732 A | * | 9/1969 | Hewitt | .......................... 156/73.5 |
| 4,676,707 A | * | 6/1987 | Cearlock | ............. B29C 65/0672 24/683 |

(Continued)

FOREIGN PATENT DOCUMENTS

| | | |
|---|---|---|
| CN | 101730606 A | 6/2010 |
| DE | 10 2007 030 806 A1 | 8/2009 |

(Continued)

OTHER PUBLICATIONS

European Search Report from European Patent Office in the corresponding European Application No. EP 13 19 8711, dated May 9, 2014.

(Continued)

*Primary Examiner* — James Sells
(74) *Attorney, Agent, or Firm* — Juan Carlos A. Marquez; Marquez IP Law Office

(57) ABSTRACT

The invention relates to a friction welding element (10, 30, 40) comprising a friction welding geometry (14, 15) and a head (12, 24, 32, 42) with a driving geometry (16, 34) for connection to a component (18, 20, 50) wherein heat originates during the friction welding process, characterized in that, at the head (12, 24, 32, 42), a material (22 26, 36, 44) is applied which is at least partially melting by means of the heat generated by the friction welding process upon contact with the surface of a component (18, 50) arranged closest to the head, and which material solidifies during cooling whereby the transition from the friction welding element (10, 30, 40) to the component (18, 50) arranged closest to the head, is sealed.

11 Claims, 4 Drawing Sheets

Figure 1:
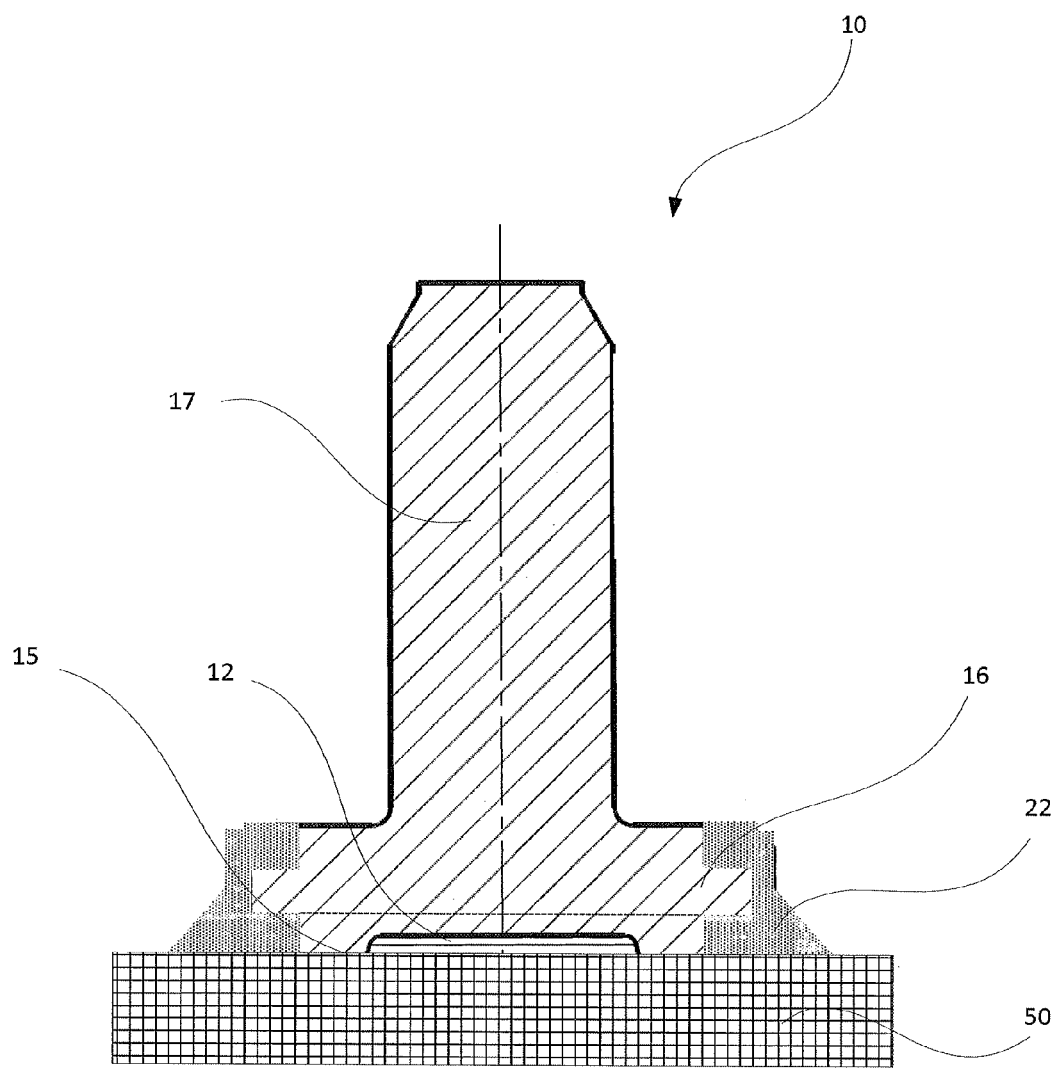

(51) Int. Cl.
  *B23K 20/16* (2006.01)
  *F16B 5/08* (2006.01)

(56) References Cited

U.S. PATENT DOCUMENTS

| | | | | |
|---|---|---|---|---|
| 5,354,160 A | * | 10/1994 | Pratt | B21J 15/00 |
| | | | | 29/243.521 |
| 6,763,568 B1 | * | 7/2004 | Mauermann et al. | 29/432.2 |
| 8,277,923 B2 | * | 10/2012 | Christ | 428/139 |
| 2005/0220533 A1 | | 10/2005 | Prichard | |
| 2010/0186900 A1 | * | 7/2010 | Christ | 156/510 |

FOREIGN PATENT DOCUMENTS

| | | |
|---|---|---|
| DE | 10 2009 028 618 A1 | 2/2011 |
| EP | 1 760 333 A1 | 8/2006 |
| WO | WO 2006/061203 | 6/2006 |

OTHER PUBLICATIONS

Office Action and Search Report in corresponding Chinese application 201310717605.8 dated Mar. 3, 2016, 6 pp. in Chinese and 8 pp. in English.

* cited by examiner

FRICTION WELDING ELEMENT

The invention relates to a friction welding element for connection to at least one component.

In a matter known per se, a friction welding element for connection purposes comprises a friction welding geometry, in particular a thorn, and a head comprising a driving geometry. The friction welding element is welded, with its friction welding geometry, to at least one component. Thereby, a connection of two, in particular plate-shaped, components can be achieved thereby that an upper component arranged closest to the head, is held together by means of the friction welding element which is connected to a lower component with the same (the lower component). As an alternative, also only the friction welding element itself may be connected with its head to a nearby component and can provide, thereby, a connection site for a further component.

In a friction welding process, heat is generated by means of the rotation of the friction welding element under the influence of an axial force. The friction welding element is connected to the component during partial melting of the friction welding geometry or the friction thorn, respectively.

According to the state of the art, transition areas between a component connected to or by means of the friction welding element, and the friction welding element is not reliably sealed off, whereby the component assembly is prone to corrosion.

It is an object of the invention to provide a friction welding element which ensures a reliable sealing of the friction welded connection.

The object is achieved through the characterizing features of claim 1 in connection with the features of the preamble thereof. The sub-claims are advantageous further developments of the invention.

In a manner known per se, the friction welding element for connection to a component comprises a friction welding geometry, in particular a thorn, a head and a driving geometry connected thereto. The driving geometry and the head may be built integrally.

During a friction welding process, heat originates by means of the rotation of the friction welding element under the influence of an axial force. In this way a lower and an upper component may be connected while melting the friction welding geometry.

According to the invention, a material is provided on the head which material is melting by means of the heat generated during the friction welding process upon contact with an surface of a component arranged closest to the head, and (which material) solidifies upon cooling. A friction welding process can be split up into a friction phase and a compression phase. The heat can be transferred to the material during the friction phase and/or during the compression phase. Thereby that the material is melted during the friction welding process and hardens after finishing the friction welding process, the transition area between the friction welding element and the component is sealed. This sealing avoids intrusion of humidity whereby corrosion is avoided as far as possible.

Since sealing processes subsequent to the friction welding process become superfluous because of the solution of the invention, an extremely advantageous and time saving solution is provided in which the friction heat is used synergetically for sealing the connection site.

The use of plastic material, in particular a thermoplastic material, has proven to be particularly advantageous. Plastic materials have the advantage that they comprise not only good sealing properties with respect to aerosols and the like, but also contribute additionally to lowering corrosion because of their electrical insulating properties. Also bracing materials are considered as materials in the sense of the invention.

According to a first advantageous embodiment, the friction welding element is arranged such that the material is formed radially outside of the head which comprises the driving geometry. By the circumferential formation of the material, in particular the plastic material, at the rim of the head of the friction welding element, it (the material) can be used in particular in a friction welding process in which the friction- and compression phases are subsequently following each other.

In the friction phase, the heat is generated by rotation of the friction element under axial pressure. This heat is transferred to the upper surface of the upper component. After completing the friction phase, the friction welding element is compressed and is pressed, thereby, into the heated upper component. Thereby, the laterally circumferentially arranged material comes into contact with the heated surface of the upper component and is melting. Thereby, it seals the connection site with the pressed-on friction element circumferentially. After cooling of the connection site, the melted portion is hardening and provides sealing of the connection site in a permanent way.

According to a further embodiment, the material may cover at least a lower edge of the head wherein this lower edge provides a supporting surface of the head on the upper component.

In that the lower edge of the head is covered with the material, it (the material) is melted during pressing the head to the surface of the lower component. This melting process may happen during a pure compression phase or in a combined movement from the friction- and compression phase. In case of a combined movement while combining the compression- and the friction phase, the material may take up, besides the temperature of the surface of the upper component, additionally the heat which originates from the rotational friction of the head on the upper component.

As the material is melted between the head and the upper component, the inpinching head may displace the melt thereunder. The melt may, thereby, fill out minor unevennesses between the head and the upper component.

A simple way for applying the material at the transition from the head to a component, is forming the material as a disk, the outer diameter of which corresponds at least to the one of the head and which comprises a concentric opening having at least an opening diameter of the friction thorn. In the combination of the disk with the friction welding element, the thorn extends through the disk.

The melting temperature of the material is preferably below the one of the friction welding element. Plastic materials, in particular thermoplastic materials, have proven to be particularly advantageous, which materials have a melting temperature between 250° C. and 400° C. On the one hand, this ensures a unproblematic handling and insures, on the other hand, a reliable melting at the temperatures originating during the friction process.

In a further embodiment, the head as a whole of the friction welding element including the driving geometry may be insert-molded with plastic material. The portions located below the lower edge and to the side of an edge of the head are, as described above, molded and thereby form the sealing of the connection side. At the same time, the portion of the plastic material which surrounds the driving geometry, remains intact whereby the complete friction welded connection is protected against external influences. Furthermore, damages on the driving geometry may be ruled out which may be generated when applying the rotational tool.

A further development of the invention results in that the driving geometry of the friction welding element is formed by the material, in particular the plastic material. In this embodiment, the driving geometry may be preferably in engagement by means of a serration locked against rotation with the head which is formed in particular out of metal and merges into the thorn.

Further advantages, features and potential applications of the present invention may be gathered from the description which follows, in conjunction with the embodiments illustrated in the drawings.

Figure 2:
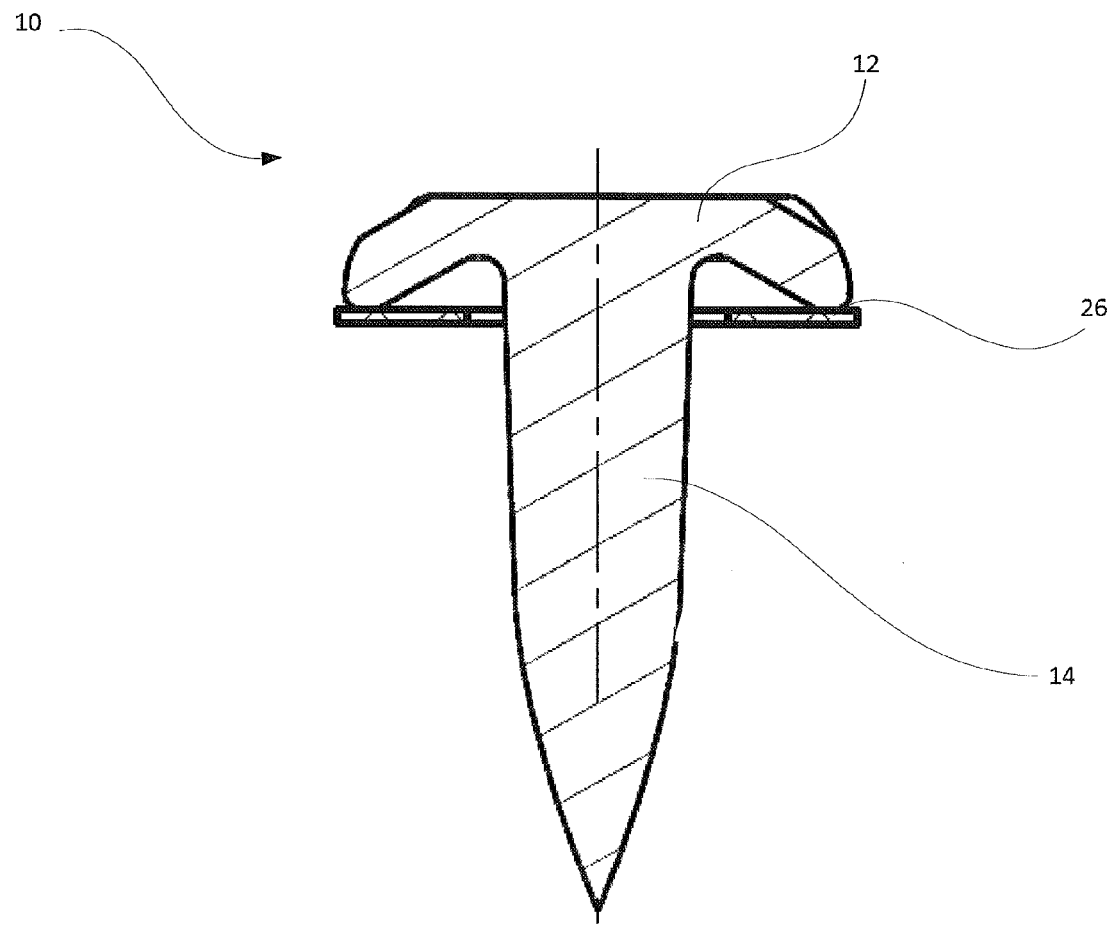
Figure 3:
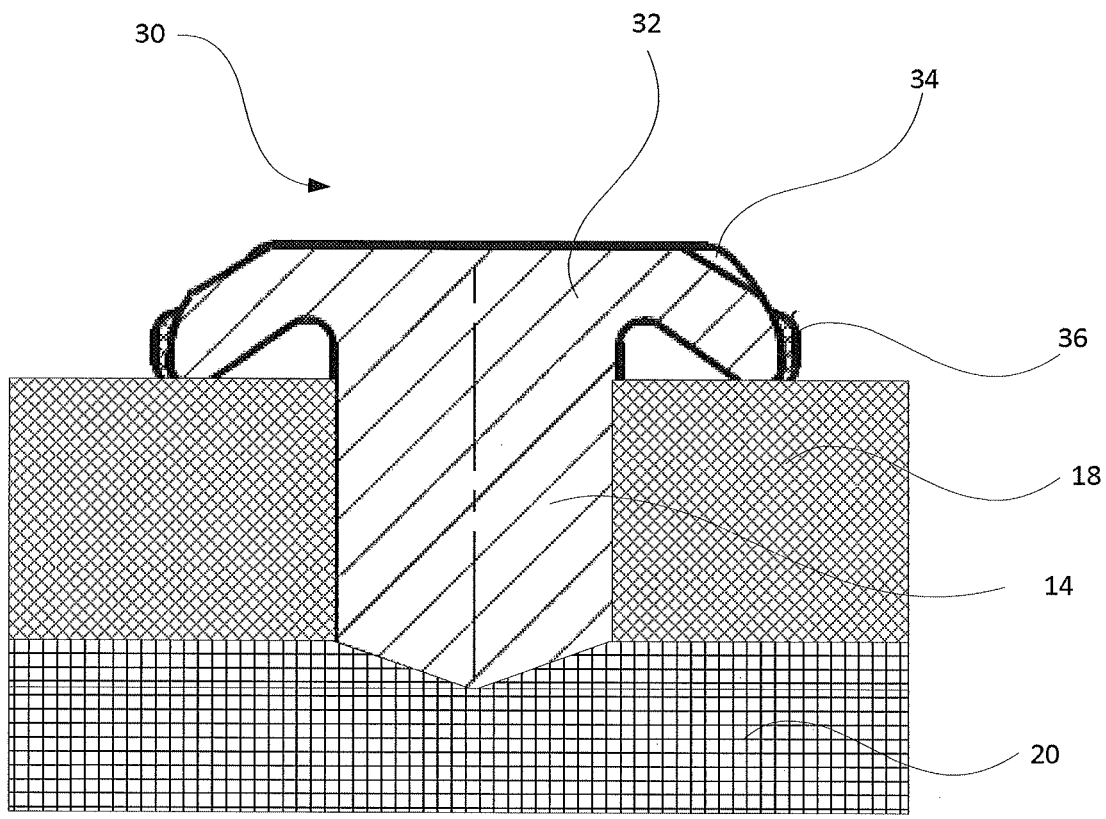

Throughout the description, the claims and the drawings, those terms and associated reference signs will be used as are notable from the enclosed list of reference signs. In the drawings is shown FIG. 1 a cross section of friction welding element with a mass bolt formed thereto;

FIG. 2 an application site in combination with a friction nail;

FIG. 3 a friction element which is integrally formed from a metal, and

Figure 4:
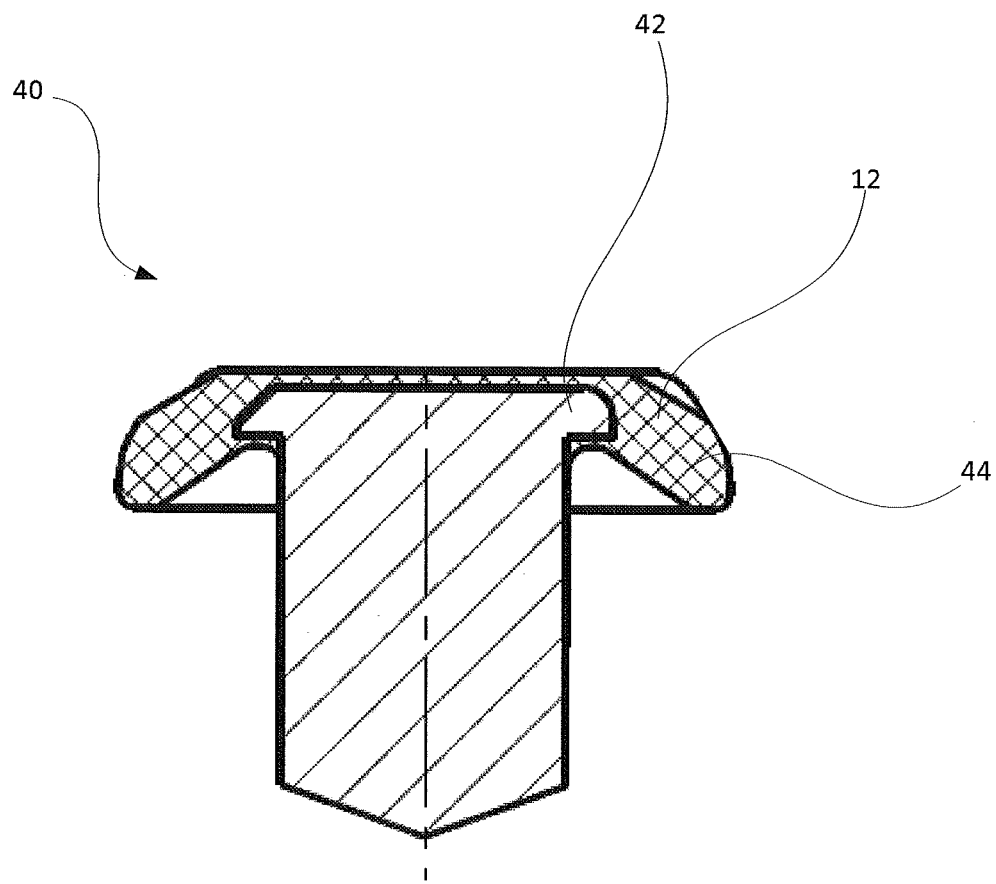

FIG. 4 a further embodiment of a friction element.

FIG. 1 shows a section of a friction welding element 10 with a head 12, and a friction welding geometry 15, where the head 12 comprises a driving geometry 16.

According to the invention, the friction welding element 10 is used for connection to a plate-shaped component 50.

The friction welded connection originates at the surface of the plate-like component 50 where the surface of the component 50 is heated up during the friction process. While applying an axial force during a rotational movement, the friction geometry 15 is melting and connects the friction welding element integrally with the plate-shaped component 50.

In FIG. 1, the friction welding element 10 is shown in a state in which the plastic ring 22 molded to its head edge, has already been melted at the heated connection site. The connection site is sealed off by means of the hardened melt. Thereby, a corrosion of the connection site is avoided. It results in an advantageous way that also additional flitter and the like is covered by the plastic material 22 which further reduces the tendency of corrosion.

The friction welding element 10, as shown in FIG. 1, carries a mass bolt 17 at its end remote from the friction welding geometry. As an alternative, also a screw shaft or other connection means are to be considered.

FIG. 2 shows a further application field of the invention in combination with a friction nail 20. In this embodiment, a section of a friction nail 20 is shown where the integral metallic friction nail 20 extends through a plastic disk 26. The plastic disk 26 is located between an upper component and the head 28 of the friction nail 20. By fixing the friction nail 20 to the combination of components, the plastic disk 25 is melted at the upper component and seals the connection site in this way. Melting can happen during the friction phase as well as during a separate compression phase.

FIG. 3 shows a friction element 30 which is produced in one piece out of metal and in which the metal head 32 which carries the driving geometry 34, is injection molded with a plastic ring 36 at its boundary area. Also in this embodiment, the plastic ring 36 is melted upon contact with the upper component. The melted plastic material thereby seals the connection site. In this way, the connection site is circumferentially sealed in one single working step of the friction welding connection process.

Under influence of an axial force and rotational movement, the friction welding element 30 is driven through the upper component 18. The friction welded connection originates at the lower component 20 while also the surface of the upper component 18 is heated up during the friction process. In FIG. 3, the friction welding element 30 is shown as it has penetrated with its head 32 into the upper component 18, and the plastic material 36 located at the edge of the head, has been melted. Thereby, the connection site is sealed. It results in an advantageous way that also flitter and the like is covered by the plastic material 36.

FIG. 4 shows a further embodiment of a friction element 40, wherein the friction element 40 comprises a so-called friction blank 42 which comprises teeth on its head 42 at its end remote from the tip, with which a driving geometry of plastic material 44 is in engagement. The driving geometry out of plastic material transfers the rotational movement necessary for the friction welding process, to the friction thorn. In this embodiment, the complete head is covered by the driving geometry out of plastic material 44.

This embodiment has the further advantage that, besides the connection site, also the complete head is covered by a plastic material whereby corrosion of the friction welding element as well as of the connected components 18, 20 is avoided.

LIST OF REFERENCE SIGNS 10 friction welding element
12 head
14 thorn
15 friction geometry
16 driving geometry
18 upper component
20 lower component
22 plastic material
24 head
26 plastic disk
30 friction element
32 metal head
34 driving geometry
36 plastic ring
40 friction element
42 friction blank/head
44 plastic material
50 component

The invention claimed is:

1. Friction welding element comprising a friction welding geometry and a metal head with a metal driving geometry for connecting to a metal component via a pressing force wherein heat originates during the friction welding process, characterized in that, at the head, the metal head includes a plastic material formed thereon which is at least partially melted by means of the heat generated by the pressing force of the friction welding process upon contact with the surface of a component arranged closest to the metal head, and which the plastic material solidifies during cooling whereby the transition from the friction welding element to the component arranged closest to the metal head, is sealed.

2. Friction welding element according to claim 1, characterized in that the component located nearest to the head, is a component to be connected with the friction welding element.

3. Friction welding element according to claim 1, characterized in that the component located closest to the head, is an upper component in a combination of components whereby the friction welding element is connected to a lower component of the combination of components.

4. Friction welding element according to claim 1, characterized in that the material is formed at least radially outside of the head and comprises a plastic material ring.

5. Friction welding element according to claim 1, characterized in that the material covers at least a lower edge of the head whereby the lower edge forms a supporting surface of the head on the surface of a component.

6. Friction welding element according to claim 5, characterized in that the material is formed as a disk wherein it comprises a recess through which a thorn is protruding.

7. Friction welding element according to claim 5, characterized in that the melting temperature of the material is between 250° C. and 400° C.

8. Friction welding element according to claim 5, characterized in that the driving geometry is formed out of the material and is applied on top of the head in an engagement secured against rotation.

9. Friction welding element according to claim 5, characterized in that the material is arranged and dimensioned such that ridges or flitter produced during the friction welding process, are taken up in the melt of the material.

10. Friction welding element according to claim 5, characterized in that the material is arranged such that it is melted during the compression phase and/or the friction phase.

11. Friction welding element according to claim 1, wherein the friction welding geometry and the metal head with the metal driving geometry are configured to connect to a metal component via rotation under a pressing force wherein heat originates during the friction welding process, characterized in that, at the head, the plastic material is at least partially melted by means of the heat generated by the rotation under the pressing force of the friction welding process upon contact with the surface of a component arranged closest to the metal head.

* * * * *